(No Model.)
H. KROPFF.
PROCESS OF AND APPARATUS FOR MALTING GRAIN.
No. 283,494. Patented Aug. 21, 1883.
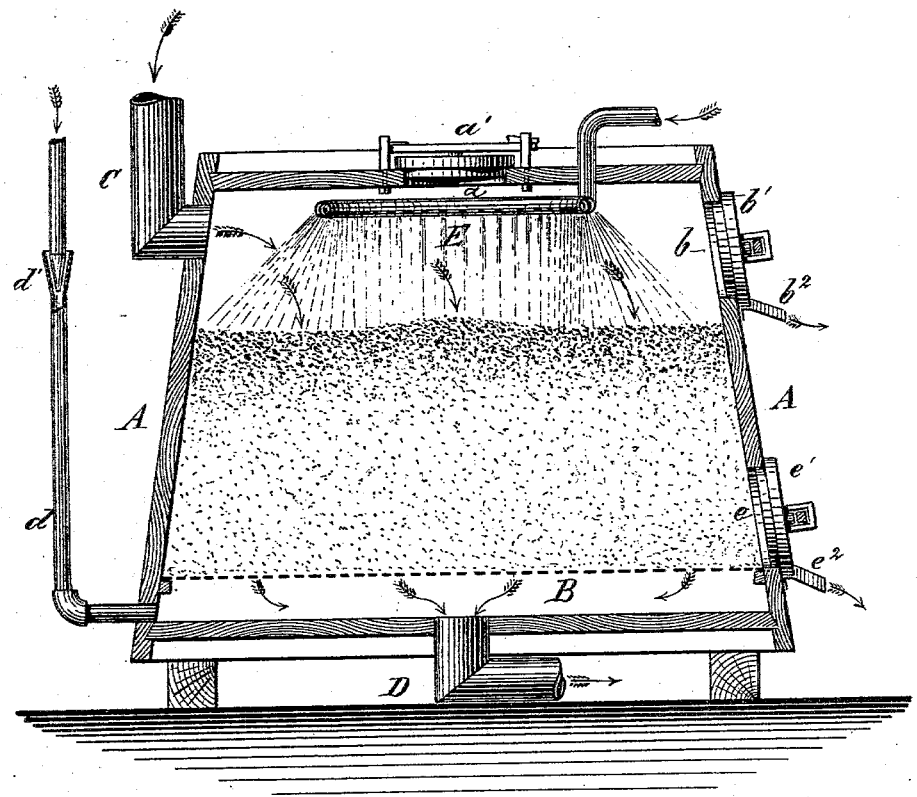
WITNESSES:
Jos. H. Rosenbaum.
Otto Risch.
INVENTOR
Hermann Kropff
BY Paul Goepel
ATTORNEY

UNITED STATES PATENT OFFICE.

HERMANN KROPFF, OF NEW YORK, N. Y.

PROCESS OF AND APPARATUS FOR MALTING GRAIN.

SPECIFICATION forming part of Letters Patent No. 283,494, dated August 21, 1883.

Application filed April 24, 1882. (No model.)

*To all whom it may concern:*

Be it known that I, HERMANN KROPFF, of the city, county, and State of New York, have invented certain new and useful Improvements in Processes of and Apparatus for Malting Grain, of which the following is a specification.

Barley is transformed into malt by going through the operations of steeping, germinating, and drying. The steeping and germinating operations are generally performed on the malt-floors, after which the sprouted barley is dried on kilns. To obtain malt of good and uniform quality during the germinating operation of the barley the grain has to be brought, in the presence of moisture, into contact with air of a uniform temperature.

This invention relates particularly to an improved process and apparatus for steeping and germinating grain; and it consists, first, of steeping the grain from the bottom in an upward direction by means of water mixed with air, and then germinating the steeped grain by forcing cold air through the same in the presence of sprays of water.

The invention consists, secondly, of a germinating vessel or tub which is provided with a perforated false bottom, with means for supplying the steeping-water from below, with air induction and eduction pipes, with an interior spray-pipe below the top of the vessel, and with hermetically-closed openings at the top and upper and lower side wall of the vessel, for charging the grain, carrying off the steeping-water, and removing the sprouted grain, respectively.

The apparatus employed for my improved process of malting is shown in the accompanying drawing, to which reference is made. This apparatus consists of an air-tight tub or vat, A, of suitable size, which is provided at some distance from the bottom with a perforated false bottom, B. The vat A is closed at the top and provided with an opening, $a$, through which the grain to be malted is introduced into the vat, after which the opening is closed by a hermetically-closing cover, $a'$. The vat is charged with grain up to nearly a level with the lower edge of the side opening, $b$, at the upper part of the vat, which side opening is also hermetically closed by a cover, $b'$, after the steeping operation is completed. During the time the grain is steeped the cover $b'$ is removed for the purpose of allowing the light floating grain to be washed off with the surplus steeping-water. The water used for steeping the grain is introduced below the false perforated bottom B, through a pipe, $d$, which is mixed with air on its way to the vat A by an air-injector, $d'$. The water charged with atmospheric air is forced through the perforated bottom in an upward direction through the body of the grain and conducted off over the spout $b^2$ of the upper side opening, $b$. When the grain is thoroughly steeped and all the light floating grain carried off with the water used for steeping, the upper side opening, $b$, is closed; also the top opening, $a$. Cooled air is then conducted to the inside of the vat through an induction-pipe, C, which opens into the vat at the upper part of the same. The cooled air is supplied by a suitable air-forcing apparatus, which communicates with the induction-pipe C. The cooled air, which is thus applied, is forced from the top downward through the body of the steeped grain in the vat and through the perforated bottom to an eduction-pipe, D. If the steeped grain becomes, by the action of the air, too warm or dry, a spray of water is intermittently supplied by means of a perforated spray-pipe, E, to the grain in the vat, the spray-pipe being arranged below the top of the vat, preferably concentrically to the charging-opening $a$, so as not to be in the way of the grain. The air may also be supplied to and forced through the grain from below and conducted off at the top; but in this case an air-current of greater force is required, as the carbonic-acid gas generated in the grain has to be carried off with the air. When the air is supplied at the top and conducted off at the bottom, the carbonic acid, by its greater specific gravity, passes off naturally with the air without requiring any extra quantity of air to remove it. When the grain has germinated or sprouted sufficiently by the influence of the air and moisture, it is removed through a side opening, $e$, and over a spout, $e^2$, which are arranged immediately above the perforated bottom, the opening being kept closed during the steeping and germinating operations by an air-tight cover, $e'$.

By arranging a series of air and water tight vats in connection with air and water supply and discharge pipes large quantities of grain can be malted. As the sprouted grain is not turned in the vat, it grows together, (felt-malt,) and is then removed to the kilns for drying in the usual manner.

The advantages of my improved process of malting grain are: First, the vats may be put up in the common malt-houses now used without requiring any change in the same, so that they are utilized, which is not the case in the different processes of pneumatic malting heretofore proposed; second, the operations of steeping and germinating are performed in one and the same apparatus, whereby the process of malting is considerably simplified; third, by charging the water used for steeping the grain with a plentiful supply of air, the separation and carrying off of the light floating grain from the heavy grain is obtained; fourth, no mechanical stirring or agitating apparatus of any kind is required, but the operations of steeping and germinating are performed by a plant of comparatively simple and inexpensive character.

I am aware that hitherto water has been passed through grain from below upward in order to separate the sound and unsound grains, and that the process of germinating by alternate sprinkling and aerating by a descending current is old.

Having thus described my invention, I claim as new and desire to secure by Letters Patent—

1. The process herein described of malting grain, which consists in passing through the mass of grain a current of water mixed with air from the bottom upward, and then subjecting the steeped grain, without agitating the same, to a current of cooled air and intermittent sprays of water, substantially as described.

2. In germinating grain in the production of malt, the process of steeping grain, which consists in passing through the mass of grain from the bottom upward a current of water charged with air, whereby the lighter floating grain is separated from the heavier grain and carried off with the surplus steeping-water, substantially as set forth.

3. An apparatus for steeping and germinating grain, consisting of a vat or tub, A, having a false bottom, B, and side opening, $b$, provided with air-tight cover $b'$, said vat having an air-induction pipe at the top, an air-eduction pipe at the bottom, and an interior spray-pipe near the top, in combination with a water-supply pipe, $d$, having an air-injector, $d'$, whereby currents of mingled water and air are forcibly injected into said vat, substantially as described.

In testimony that I claim the foregoing as my invention I have signed my name in presence of two subscribing witnesses.

HERMANN KROPFF.

Witnesses:
PAUL GOEPEL,
CARL KARP.